April 12, 1966 L. F. KOOISTRA 3,245,708
PRESSURE VESSEL CLOSURE FLANGE CONNECTION
Original Filed Aug. 28, 1962
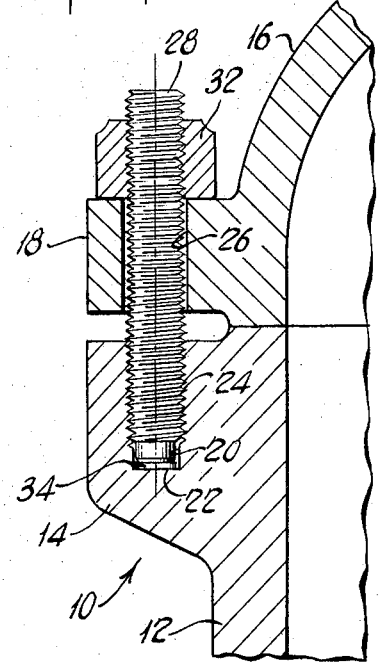
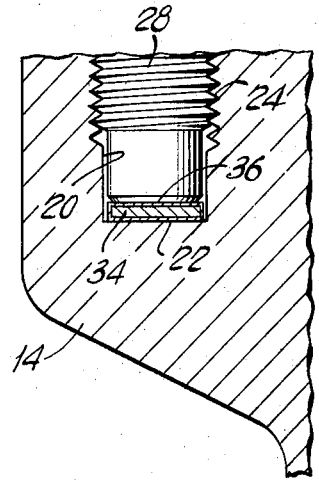
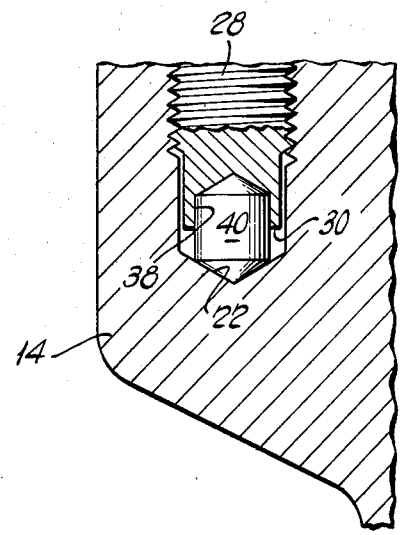
INVENTOR.
LAMBERT F. KOOISTRA
BY
ATTORNEY United States Patent Office 3,245,708
Patented Apr. 12, 1966

3,245,708
PRESSURE VESSEL CLOSURE FLANGE
CONNECTION
Lambert F. Kooistra, Akron, Ohio, assignor to The Babcock & Wilcox Company, New York, N.Y., a corporation of New Jersey
Continuation of application Ser. No. 219,926, Aug. 28, 1962. This application Dec. 31, 1964, Ser. No. 425,105
6 Claims. (Cl. 292—256.71)

This application is a continuation of my application Serial No. 219,926, filed on August 28, 1962, and now abandoned.

The present invention relates in general to a device for the prevention of seizure of a pressure vessel closure flange connection and more particularly to the prevention of seizure of a stud therefore threadedly connected in a blind hole of one of the flanges.

Openings are provided in many pressure vessels which must be closed by removable closure members each held in place by a plurality of studs screwed into blind holes in the flange associated with the pressure vessel wall. It has been realized that the investment in such a pressure vessel can be jeopardized should one or more of the studs become severely seized in the blind hole. Accordingly, an effort was made to determine the cause of such seizures of studs in blind holes and to discover a means whereby such seizures could be prevented. This investigation showed that such seizures were caused by the high bearing loads imposed upon the mating threads of the assembly. It was further found that these high loads were often caused by the studs being bottomed in the corresponding hole with a large force. During high temperature operation, to which many of these constructions are subject, the mating thread surfaces become coated with a thin oxide film which causes the mating surfaces to become keyed together. While it was found that this did not itself cause the seizure, it resulted in seizure when the mating surfaces were moved under a compressive load. It was further discovered that by preventing the bottoming of the studs in the blind holes with a large force the possibility of seizure would be greatly decreased, if not eliminated.

While a simple way of preventing a high compressive force between the mating thread surfaces would be to screw the stud completely into the hole and then to back it off approximately a half turn, this method is not dependable since it requires much supervision or diligence on the part of the operator.

Accordingly, the present invention provides a bolted device subject to high temperature operation comprising means forming an internally threaded hole having a closed end and an externally threaded element adapted to be threadedly connected in the hole, and a filler element formed of a material subject to deformation at the high temperature of operation positioned between the closed end of the hole and the threaded element to prevent seizure of the threaded element in the hole.

Furthermore, the present invention provides that the filler element may be formed of a material subject either to melting or to creep deformation at the temperature of operation.

Additionally, the present invention provides a threaded element, either a bolt or a stud, which has an end portion subject to bottoming in a blind hole which end portion is formed of a material which is subject to plastic deformation at the operating temperature.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Of the drawings:
FIGURE 1 illustrates a cross-section through a pressure vessel flange closure incorporating the present invention;
FIGURE 2 is an enlarged section of a portion of the device shown in FIGURE 1; and
FIGURE 3 is an enlarged section showing an alternate arrangement of the device shown in FIGURE 1.

FIGURE 1 shows a cross-section through a pressure vessel generally indicated by 10, illustrating the application of the present invention. This pressure vessel comprises a cylindrical shell portion 12 terminating in a closure flange 14. A hemispherical closure head 16 having a flange 18 adapted to mate with the closure flange 14 is arranged to close the open end of the cylindrical pressure vessel. A plurality of blind holes 20 having a closed end 22 are formed in the closure flange 14 and are provided with internal threads 24. Non-threaded holes 26 are provided through flange 18 in alignment with holes 20. An externally threaded element 28, for instance a bolt or stud, is screwed into hole 20 until the end of the stud 30 bottoms on closed end 22 of hole 20. A nut 32 is then threadedly attached to bolt 28 holding closure head 16 in sealing engagement with pressure vessel 12 creating a pressure-tight closure.

It has been found that when the bolt 28 is bottomed in the blind hole and the assembly is subject to high temperature operation, subsequent removal of the bolt 28 from the hole 20 is difficult, if not impossible, since the mating threads between the bolt and the hole seize. It has been found that placing a filler element 34 formed of a material subject to deformation at the operating temperature and having a smaller diameter than the hole 20 between the end of the bolt 30 and the closed end 22 of the threaded hole 20 prevents seizure of the bolt in the hole as will be further described herein below.

The filler element 34 may be formed either of a material which melts at the operating temperature enclosed within a non-melting flexible outer sheath 36 or it may be a material subject to creep deformation at the operating temperature.

The operation of the filler element in preventing seizure of the bolt in blind holes results from the fact that the seizing action takes place when the bolt has been bottomed in the blind hole resulting in a load being imposed upon the lower mating threads of the bolt and the hole. It is believed that when the load is maintained for an extended period at a high temperature any lubricating film that may have been applied to the contacting surfaces is burned out and a very thin oxide film is formed on the contacting thread surfaces. This oxide film layer, requiring a greater volume than the metal from which it was formed, gives rise to the probability of seizure.

While the aforementioned load is applied to the lower threads this increased volume is not available and, as a result, the contacting thread surfaces are keyed together under high pressure. When the mating thread surfaces are caused to move relative to one another, seizure between the surfaces is initiated becoming more aggravated with each additional increment of movement. By positioning the filler element of the present invention between the end of the bolt and the closed end of the hole when the assembly is heated to the operating temperature the initial load is relaxed since the filler element will either melt or be subject to creep deformation at that temperature, reducing its thickness. This deformation of the filler element relaxes the load on the mating threads so that subsequent relative movement of the mating threads does not give rise to the seizure therebetween.

In an experiment carried out for the purpose of determining the practicability of the present invention twenty-four 1½ inch 12USF bolts were bottomed in twenty-four blind holes with a torque of 100 ft.-lbs. Filler elements formed of copper were randomly placed in the bottom of 12 holes. The test assembly was then subjected to a temperature of 555° F. for 2,001 hours, after which the bolts were loosened with a torque wrench. It was found that upon removal the bolts in holes containing filler elements required only one-twelfth the removal torque necessary for the bolts assembled in holes not containing the filler elements. Furthermore, it was noted that after the application of the first breaking torque during the bolt loosening procedure all the bolts assembled in holes containing filler elements were easily removed whereas four of the bolts positioned in holes without filler elements seized completely and could not be removed.

An alternate arrangement embodying the present invention is illustrated in FIGURE 3 where the end 30 of the bolts 28 is provided with a recess 38 within which is positioned a filler element 40 forming an integral part of the end of the bolt. By forming the filler element 40 of a material subject to creep deformation at the operating temperature it will be possible to re-use such a bolt many times since each load relaxing movement of the filler element will be only a few thousandths of an inch.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A pressure vessel closure flange connection for a pressure vessel subject to high temperature operation causing the formation of an oxide film on mating thread surfaces, said pressure vessel having an opening therein, a flange surrounding said opening having an internally threaded hole therein, said hole having a closed end, an externally threaded member threadedly connected in said hole in said flange, and a filler element having a deformation temperature lower than the operating temperature of said pressure vessel disposed between said closed end of said hole and the end of said threaded member, said filler element arranged to undergo plastic deformation during the high temperature operation of said pressure vessel relieving the compressive forces on said oxide film and preventing seizure of said threaded member in said hole.

2. A pressure vessel closure flange connection for a pressure vessel subject to high temperature operation causing the formation of an oxide film on mating thread surfaces, said pressure vessel having an opening therein, a flange surrounding said opening having a plurality of internally threaded holes therein, each of said holes having a closed end, a plurality of externally threaded stud members threadedly connected in said holes in said flange, and a plurality of filler elements having a deformation temperature lower than the operating temperature of said pressure vessel disposed between said closed end of each of said holes and the ends of said studs, said filler elements arranged to undergo plastic deformation during the high temperature operation of said pressure vessel reducing the thickness of said filler elements relieving the compressive forces on said oxide film and preventing seizure of said studs in said holes.

3. A pressure vessel closure flange connection comprising a pressure vessel subject to high temperature operation causing the formation of an oxide film on mating thread surfaces, said pressure vessel having an opening therein, a first flange surrounding said opening, a closure for said opening having a second flange arranged in cooperating relationship with said first flange, said first flange having a plurality of internally threaded holes therein, each of said holes having a closed end, said second flange having a plurality of holes extending therethrough arranged in alignment with said holes in said first flange, a plurality of externally threaded stud members threadedly connected in said holes in said first flange and extending through said holes in said second flange, a plurality of nuts threadedly connected to said studs and arranged to maintain said second flange in sealing relationship with said first flange, and a plurality of filler elements having a deformation temperature lower than the operating temperature of said pressure vessel disposed between said closed ends of said holes and the ends of said studs, said filler elements arranged to undergo plastic deformation during the high temperature operation of said pressure vessel reducing the thickness of said filler elements relieving the compressive forces on said oxide film and preventing seizure of said studs in said holes.

4. A pressure vessel closure flange connection comprising a pressure vessel subject to high temperature operation causing the formation of an oxide film on mating thread surfaces, said pressure vessel having an opening therein, a first flange surrounding said opening, a closure for said opening having a second flange arranged in cooperating relationship with said first flange, said first flange having a plurality of internally threaded holes therein, each of said holes having a closed end, said second flange having a plurality of holes extending therethrough arranged in alignment with said holes in said first flange, a plurality of externally threaded stud members threadedly connected in said holes in said first flange and extending through said holes in said second flange, a plurality of nuts threadedly connected to said studs and arranged to maintain said second flange in sealing relationship with said first flange, and a plurality of filler elements having a deformation temperature lower than the operating temperature of said pressure vessel disposed in the ends of said studs adjacent said closed ends of said holes, said filler elements arranged to undergo plastic deformation during the high temperature operation of said pressure vessel reducing the thickness of said filler elements relieving the compressive forces on said oxide film and preventing seizure of said studs in said holes.

5. In a bolted device subject to high temperature operation causing the formation of an oxide film on mating thread surfaces, said bolted device comprising means forming an internally threaded hole having a closed end and an externally threaded element arranged to be threadedly connected in said hole, a filler element positioned between said closed end of said hole and said threaded element, said filler element formed of a material subject to plastic deformation during high temperature operation of said bolted device to relieve the compressive forces on said oxide film and prevent seizure of said threaded element in said hole.

6. In a bolted device subject to high temperature operation causing the formation of an oxide film on mating thread surfaces, said bolted device comprising means forming an internally threaded hole having a closed end and an externally threaded element arranged to be threadedly connected in said hole, a filler element positioned between said closed end of said hole and said threaded element, said filler element having a center portion formed of a material having a melting temperature lower than said operating temperature and an outer flexible sheath sealingly enclosing said center portion, said filler element arranged to undergo plastic deformation during high temperature operation of said bolted device relieving the compressive forces on said oxide film and preventing seizure of said threaded element in said hole.

References Cited by the Examiner

UNITED STATES PATENTS 2,294,636 9/1942 Stearns _____ 292—256.73 X
2,679,414 5/1954 Hornschuch _____ 151—70 X

FOREIGN PATENTS 569,861 2/1959 Canada.
585,830 2/1947 Great Britain.

JOSEPH D. SEERS, *Primary Examiner.*
M. HENSON WOOD, JR., *Examiner.*